United States Patent [19]

Madden, II

[11] Patent Number: 4,857,283

[45] Date of Patent: Aug. 15, 1989

[54] USE OF SULFUR DIOXIDE FOR CORROSION INHIBITION IN ACID GAS SCRUBBING PROCESSES

[75] Inventor: Patrick C. Madden, II, Whippany, N.J.

[73] Assignee: Exxon Research and Engineering Company, Florham Park, N.J.

[21] Appl. No.: 138,752

[22] Filed: Dec. 28, 1987

[51] Int. Cl.$^4$ ............... C01B 17/16; C01B 31/20
[52] U.S. Cl. ................... 423/228; 429/229; 252/189; 252/387
[58] Field of Search .......... 423/243, 228, 229; 252/189, 387

[56] References Cited

U.S. PATENT DOCUMENTS

| | | | |
|---|---|---|---|
| 3,438,660 | 4/1969 | Scheverman et al. | 406/48 |
| 3,634,232 | 1/1972 | Dunlop | 252/387 |
| 3,887,330 | 6/1975 | Horvath | 21/2.5 R |
| 4,071,470 | 1/1978 | Davidson et al. | 423/228 X |
| 4,143,119 | 3/1979 | Asperger et al. | 423/228 X |
| 4,541,946 | 9/1985 | Jones et al. | 252/189 |

FOREIGN PATENT DOCUMENTS 1436722  5/1976  United Kingdom ............... 252/387

*Primary Examiner*—Gregory A. Heller
*Attorney, Agent, or Firm*—Henry E. Naylor

[57] ABSTRACT

Disclosed is a process for scrubbing acid gases from an $H_2$-containing acid gas stream by use of an aminecontaining aqueous scrubbing solution wherein the corrosion of metal surfaces in contact with such a solution is inhibited by use of an effective amount of sulfide dioxide.

8 Claims, 1 Drawing Sheet

USE OF SULFUR DIOXIDE FOR CORROSION INHIBITION IN ACID GAS SCRUBBING PROCESSES

BACKGROUND OF THE INVENTION

The present invention is related to a process for inhibiting corrosion of metal surfaces which are in contact with $H_2S$-containing acid gas streams treated with an aqueous amine-containing scrubbing solution. Corrosion is inhibited by use of a thiosulfate salt in the presence of sulfide or hydrosulfide ions.

The sweetening of natural and synthetic gases has been practiced for many years. Typically, this has involved the removal of acidic compounds such as $CO_2$, $H_2S$ and COS by absorption of the acid gases in a liquid absorbent medium. Various aqueous, absorbing or scrubbing solutions have been utilized to remove the acidic components. Such solutions include those containing alkanolamines, sulfolane (2, 3, 4, 5-tetrahydrothiophene-1, 1-dioxide); 2, 3, 4, 5-tetrahydrothiophene-1, 1-dioxide with diisopropanol amine and potassium carbonate solutions. Each of these systems experiences corrosion of metal surfaces in contact with the scrubbing solution, which may be attributable to one or more of the following: decomposition of the scrubbing solution; reaction of the acidic components of the gas and the absorbent; and direct attack by the acidic components in the gases. This corrosion may occur throughout the entire gas treating system on metal surfaces in contact with the solutions and the acid gas.

U.S. Pat. No. 3,887,330 discloses a method for preventing sulfur corrosion of ferrous materials in pipelines wherein ammonium polysulfide as an aqueous solution is mixed with an essentially non-aqueous sulfur hydrocarbon slurry. The ammonium polysulfide may be externally added or may be formed by reaction of ammonium hydrosulfide with free sulfur in the slurry.

U.S. Pat. No. 3,438,680 describes a similar method for transporting sulfur particles through a pipeline wherein sulfur particles are intimately mixed with an aqueous solution of a polysulfide salt to form a slurry, the slurry is pumped through a pipeline and the sulfur particles are removed from the aqueous solution. The polysulfide salt used as carrier is reported to prevent corrosion.

Use of alkali metal sulfides per se as corrosion inhibitors in ammonium nitrate-urea deicer compositions is reported in U.S. Pat. No. 3,297,577.

For some gas treating processes, i.e., those characterized as hot carbonate processes, it is reported that hydrogen sulfide gas can inhibit corrosion. See Bienstock et al., *Corrosion*, 17, 571 (1961), Benson et al., *Petroleum Refiner*, 39, 127 (1960) and a pamphlet from the U.S. Department of the Interior Bureau of Mines, "Removing Hydrogen Sulfide By Hot Potassium Carbonate Absorption", by Field et al. (1954). However, for most gas treating processes using aqueous amine solutions, $H_2S$ per se is not an effective corrosion inhibitor. Process designs of this type are well known to limit the acid gas content of such solutions in order to minimize corrosion.

SUMMARY OF THE INVENTION

In accordance with the present invention, there is provided a method for inhibiting corrosion of metal surfaces in contact with $H_2S$-containing acid gas streams and aqueous amine scrubbing solutions, which method comprises: contacting the $H_2S$-containing stream with an amine scrubbing solution in the presence of an effective amount of $SO_2$ and an effective amount of sulfide and/or hydrosulfide ions.

In preferred embodiments of the present invention, the resulting polysulfide from the reaction of thiosulfate with sulfide and/or hydrosulfide ions, expressed as weight of total elemental sulfur in the scrubbing solution, may range from about 0.01 to about 6 weight percent, preferably from about 0.02 to about 3 weight percent, and more preferably from about 0.03 to 1 weight percent.

DETAILED DESCRIPTION OF THE INVENTION

Figure 1:
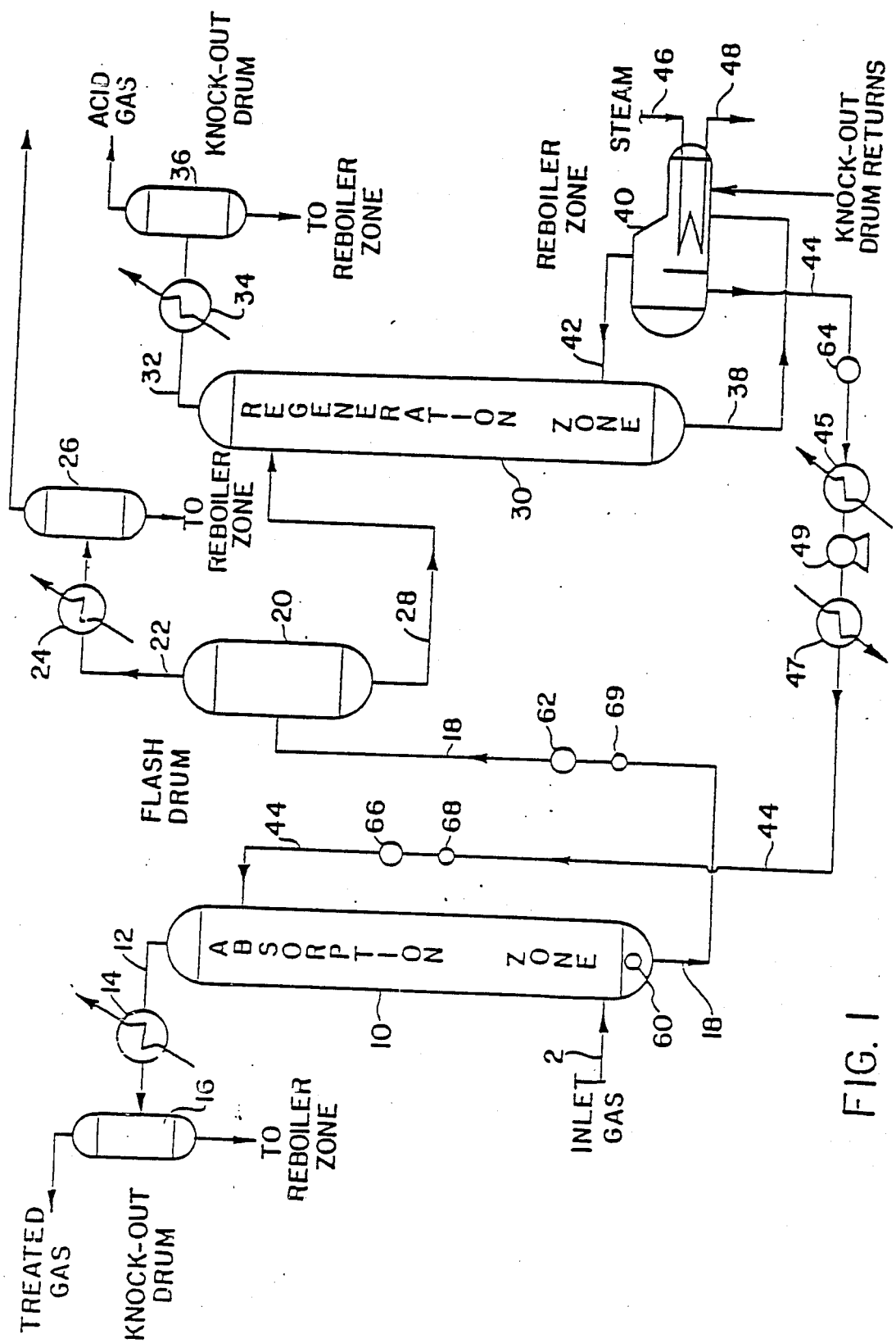
FIG. 1 is a simplified process flow diagram of a typical gas treating unit.

Acid gas-containing streams suitable for treatment herein are those streams which contain $H_2S$. Other acid gases may also be present, such as those selected from $CO_2$, $SO_2$, $SO_3$, $CS_2$, HCN, COS and the oxygen and sulfur derivatives of $C_1$ to $C_4$ hydrocarbons as they frequently appear in gaseous mixtures. Except for $CO_2$ and $H_2S$, these gases normally are present only in small amounts within a gaseous mixture or feed. Such acid gas-containing gaseous streams can result from the processing of oil, chemicals, and coal.

While it is believed that the subject invention will have applicability to a wide variety of acid gas scrubbing solutions, the present invention is especially applicable to aqueous amino scrubbing solutions, particularly alkanolamines (aminoalkanols), and more particularly to sterically-hindered amine scrubbing solutions. The subject invention is also applicable to amine-promoted alkaline salt scrubbing solutions.

For amine-promoted aqueous alkali metal salt scrubbing systems, the alkali metal salt can be selected from the group consisting of alkali metal bicarbonates, carbonates, hydroxides, borates, phosphates and mixtures thereof. The concentration of the alkali metal compound is preferably about 10 to about 40 weight percent of the entire weight of the solution. Most preferably, potassium carbonate is used in a concentration of about 20 to 35 weight percent.

Preferably, the processes of this invention are carried out at temperatures of 35° to 150° C., more preferably 60° to 130° C.

Non-limiting examples of amino compounds suitable for use herein for removing acid gases are alkanolamines such as monoethanolamine (MEA), diethanolamine (DEA), dipropanolamine (DPA), hydroxy ethoxyethylamine (DGA), diisopropanolamine (DIPA), methyldiethanolamine (MDEA), diethylmonoethanolamine (DEAE), and the like. Preferred is monoethanolamine. Also suitable is 2-piperidine ethanol (PE), and the like.

In addition, the amino compounds can be sterically hindered, such as those disclosed in U.S. Pat. Nos. 4,471,138; 4,405,586; 4,405,851; and 4,112,050, all of which are incorporated herein by reference. By sterically hindered, we mean those amino compounds having a degree of steric hindrance such that the cumulative $-E_s$ value (Taft's steric hindrance constant) is greater than about 1.75 as calculated from the values given for primary amines in Table V in D. F. Detar, *Journal of Organic Chemistry*, 45, 5174 (1980).

Amino compounds suitable for use herein have a $pK_a$ value at 20° C. greater than 8.6 for this use, preferably greater than about 9.5, and more preferably for amino ether alcohols the $pK_a$ value will range between about 9.5 and about 10.6. If the $pK_a$ is less than 8.6 the reaction with $H_2S$ is decreased, whereas if the $pK_a$ of the amino compound is much greater than about 10.6, an excessive amount of steam is required to regenerate the scrubbing solution. Also, to insure operational efficiency with minimal losses of the amino compound, the amino compound preferably has a relatively low volatility. For example, the boiling point of the amino compound (at 760 mm) is typically greater than about 180° C., preferably greater than 200° C., and more preferably greater than 225° C.

The aqueous amino scrubbing solutions generally have a concentration of amino compound of about 0.1 to 6 moles per liter of the total solution, and preferably 1 to 4 moles per liter, depending primarily on the specific amino compound employed.

The scrubbing solution may include a variety of additives typically employed in selective gas removal processes, e.g., antifoaming agents, anti-oxidants, and the like. The amount of these additives will typically be in the range that they are effective for their intended purpose, i.e., an effective amount.

The amount of $SO_2$ used in the aqueous scrubbing solution is an amount which is effective to inhibit corrosion. This amount is such that the resulting polysulfide, expressed as total weight of elemental sulfur, will range between about 0.01 to about 6 weight percent, preferably from about 0.02 to about 3 weight percent, and more preferably from about 0.03 to 1 weight percent.

The corrosion inhibition properties of $SO_2$ are dependent on the presence of an effective amount of sulfide or hydrosulfide ion. By effective amount we mean that minimum amount of $SO_2$ and sulfide and/or hydrosulfide ions needed to result in a polysulfide concentration such that the above minimum elemental sulfur requirement is met.

Although not wishing to be bound by theory, it is believed that $SO_2$ is converted to thiosulfate which in turn is in equilibrium with polysulfide. Such a scheme can be represented by:

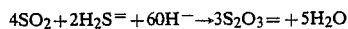

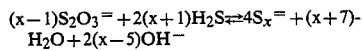

where x is between 2 and 8.

For hot carbonate application, the solvent employed in the solution herein is preferably water, but may also be a mixture of water and a cosolvent such as pipecolinic acid, as described above, or a mixture of water and a physical absorbent such as sulfolane or merely the physical absorbent for the amine application.

It is noted that the acid gases are usually contacted with the scrubbing solution at elevated temperatures, such as at the boiling point of the scrubbing solution or higher. The stability of the resulting polysulfide film, produced by the reaction of $SO_2$ with sulfide and/or hydrosulfide, can be improved if desired or necessary by treating the metal surfaces prior to contact with the acid gas and amine scrubbing solution. To accomplish this, the metal surfaces are treated with a sulfur-containing gas, preferably an $H_2S/N_2$ mixture; an effective amount of $SO_2$, and the amine scrubbing solution, for an effective amount of time. That is, for a time long enough to produce a substantially uniform polysulfide film over the entire metal surfaces. This time will usually range from about two hours to several days at elevated temperatures, depending on the severity of the corrosion conditions. Metal surfaces which are protected in accordance with this invention are generally those ferrous alloys used in gas treating equipment. In a preferred embodiment, the scrubbing solution containing the $SO_2$ is circulated with the $H_2S/N_2$ gaseous mixture at a temperature of about 120° C., for up to one week.

A simplified schematic drawing of a typical acid gas treating unit which would be used for such tests is shown in FIG. 1. In this drawing, piping, equipment, instrumentation and valves not necessary for an understanding of the present invention have been omitted for clarity. In this figure, acid-containing gas enters absorption zone 10 through inlet 2 located near the base. Scrubbing or absorbing solution enters absorption zone 10 near the top through line 44. Absorption zone 10 may be a packed, trayed or similar type column in which the upwardly flowing gas stream and the downwardly flowing scrubbing solution are effectively contacted. After the removal of at least a portion of the acidic compounds from the gas stream, the gas stream exiting absorption zone 10 passes through line 12, condenser 14 and knock-out drum 16 for further processing (not shown). The absorbing solution enriched in acidic compounds passes from the base of absorption zone 10 through line 18 into flash zone 20. Vapor passes from flash zone 20 through line 22, condenser 24 and knock-out drum 26 for further treatment (not shown). The non-vaporized absorbing solution passes from flash drum 20 through line 28 into regeneration zone 30 wherein acidic compounds are stripped from the absorbing solution, passing out of zone 30 through line 32, condenser 34, and knock-out drum 36 for further processing (not shown). Absorbing solution from the base of regeneration zone 30 passes through line 38 into reboiler zone 40. A fraction of the absorbing solution entering reboiler zone 40 is vaporized and returned to regeneration zone 30 via line 42, while the remainder is returned to absorption zone 10 by line 44 after passing through cooler 45 and heater 47 before and after pump 49, respectively. Steam or other heat transfer material enters reboiler 40 through line 46 and exits through line 48.

As used hereinafter, scrubbing solution which has been stripped of acidic compounds is termed "lean" solution, while scrubbing solution which contains a significant quantity of absorbed acidic compound is "rich" solution. To conduct corrosion tests corrosion coupons 60 would be installed in the base of absorption zone 10 to measure the corrosion rate of the rich solution in absorption zone 10, while a corrosion probe and coupon assembly 62 would be installed in transfer line 18 to monitor the corrosion of rich solution being transferred to regeneration zone 30. Corrosion probe and coupon assemblies 64 in the hot lean solution and 66 in the cold lean solution would be installed in transfer line 44 to monitor the corrosion rate in the lean absorbing solution returned to the absorption zone. Corrosion tubing velocity sections 68 and 69 would be installed in lines 44 and 18, respectively, to measure the effect of increased velocity on the corrosion rate in the lean and rich solutions, respectively.

The following examples will demonstrate the effectiveness of the present corrosion inhibitor in reducing the corrosion rate of an acid gas-containit aqueous alkaline solution below that obtainable in the absence of a corrosion inhibitor. In the examples all parts and percentages are by weight and all temperatures in degrees Celsius unless otherwise noted. In addition, the corrosion rates expressed in the examples represent values obtained from water washing, not honing.

Use of Sulfur Dioxide in MEA Solution for On-line Passivation in Small Pilot Plant A two month run was made in a small (three gallon inventory) pilot plant to demonstrate the corrosion inhibition properties of sulfur dioxide. Carbon steel corrosion coupon data from this run are presented in Table I. The pilot plant was started up on day 1 with solution taken from a previous pilot plant run containing about 18 Wt % MEA, 0.75 Wt % polysulfide, and 0.10 Wt % thiosulfate. On day 26, the solution was drained from the unit and replaced with fresh 20 wt % MEA. After bringing the solution to temperature, but before beginning acid gas addition, about 200 grams (2.0 wt % of the solution) of $SO_2$ gas was injected into the solution. This solution remained in the unit until day 47 when it was again drained and replaced with fresh 20 wt % MEA. It is estimated that 5-10% of the solution remained in the unit even after draining, and this explains the small amount of polysulfide/thiosulfate measured in the fresh solution.

The corrosion data clearly show the inhibitive properties of $SO_2$. All of the coupons show significant corrosion during their first period on stream, as is characteristic of on-line passivation. Coupon K-42 began to show some reduction in corrosion after exposure to the original solution (38.2 to 30.6 mpy), and substantial reduction after introduction of $SO_2$ (3.9 mpy). Likewise, coupons K-63, K-56, and K-61 all showed the characteristic large drop in corrosion rate after their first period on line. Only K-38 failed to show reduced corrosion after its first period on line, and this is attributed to the fact that it experienced the lowest polysulfide concentration and relatively high acid gas loadings. This data tends to support the concept of a lower limit in polysulfide concentration for effective on-line passivation, although severity (gas loadings) and time obviously play a significant role.

TABLE I

CORROSION COUPON DATA FROM SMALL GAS TREATING PILOT PLANT

| Period | | | | | | |
|---|---|---|---|---|---|---|
| Start Day | 1 | 13 | 26 | 36 | 47 | 62 |
| End Day | 13 | 26[1] | 36 | 47[3] | 62 | 69 |
| MEA, Wt. % | 18 | 17.5 | 19 | 20 | 18 | 20 |
| $CO_2$ mol/mol | .08 | .08 | .06 | 0.07 | 0.08 | 0.08 |
| $H_2S$ mol/mol | .35 | .25 | .25 | 0.22 | 0.29 | 0.25 |
| Temperature, °F. | 265 | 265 | 265 | 265 | 265 | 265 |
| Polysulfide, Wt. % | 0.75 | 0.33 | 1.9[2] | 1.2 | .075[4] | 0.1[4] |
| Thiosulfate, Wt. % | 0.1 | 0.05 | 0.67 | 0.4 | 0.01 | .02 |

| Corrosion Results | Mils/Year (Water Washed) | | | | | |
|---|---|---|---|---|---|---|
| Coupon: | | | | | | |
| K-42 | 38.2 | 30.6 | 3.9 | 1.8 | 0.2 | 0.5 |
| K-63 | — | 31.7 | 1.5 | 1.1 | 0.4 | 1.1 |
| K-56 | — | — | 53.6 | 8.3 | 2.6 | 4.3 |
| K-61 | — | — | — | 42.5 | 4.7 | 4.8 |
| K-38 | — | — | — | — | 33.9 | 32.2[5] |
| K-58 | — | — | — | — | — | 26.5 |

[1]Solution was drained on day 26 and replaced with fresh 20% MEA.
[2]2 wt. % $SO_2$ gas was injected into the solution on day 26, immediately before starting the continuous flow of acid gas.
[3]Solution drained on day 47 and replaced with fresh 20% MEA.
[4]Polysulfide attributed to small amount of previous solution not completely drained.
[5]Polysulfide level not high enough to provide on-line passivation at these conditions.

What is claimed is:

1. In a process for removing acidic gases from an $H_2S$-containing acid gas stream, when said acid gas stream is contacted with an amine-containing scrubbing solution at elevated temperatures to remove acid gases, the improvement which comprises pretreating the metal surfaces which will be in contact with the $H_2S$-containing acid gas stream with a mixture comprised of: $SO_2$, an $H_2S$-containing gas, and an amine scrubbing solution, such that: (i) the acid gas loading is 0.3 or less when expressed as moles of $H_2S$-containing acid gas/moles of amine; and (ii) the amount of $SO_2$ is such that the resulting polysulfide film on said metal surfaces, expressed as total weight of elemental sulfur, ranges from about 0.01 to 6 wt %.

2. The process of claim 1 wherein the amount is from about 0.02 to 3 weight percent.

3. The process of claim 2 wherein the amount is from about 0.03 to 1 weight percent.

4. The process of claim 1 wherein the amine component of the scrubbing solution is a sterically hindered amine.

5. The process of claim 1 wherein the amine component of the scrubbing solution is an alkanolamine.

6. The process of claim 5 wherein the alkanolamine is monoethanolamine.

7. The process of claim 1 wherein an alkaline material is also present.

8. The process of claim 7 wherein the alkaline material is potassium carbonate.

* * * * *